United States Patent [19]
Hardgrove

[11] Patent Number: 6,099,284
[45] Date of Patent: Aug. 8, 2000

[54] PRESSURE-ACTIVATED GAS INJECTION VALVE FOR AN INJECTION MOLDING APPARATUS

[75] Inventor: William Hardgrove, Englewood, Ohio

[73] Assignee: Green Tokai, Co., Ltd., Brookville, Ohio

[21] Appl. No.: 09/114,654

[22] Filed: Jul. 13, 1998

[51] Int. Cl.[7] .................................................. A21C 3/00
[52] U.S. Cl. ........................ 425/130; 264/572; 425/564; 425/566
[58] Field of Search .................................. 425/562, 563, 425/564, 565, 566, 130; 264/572

[56] References Cited

U.S. PATENT DOCUMENTS

| | | | |
|---|---|---|---|
| 4,043,740 | 8/1977 | Gellert | 425/567 |
| 4,062,517 | 12/1977 | Jones | 251/322 |
| 4,140,470 | 2/1979 | Pasch et al. | 425/544 |
| 4,201,742 | 5/1980 | Hendry | 264/45.5 |
| 4,316,600 | 2/1982 | Parise et al. | 251/245 |
| 4,389,358 | 6/1983 | Hendry | 264/45.1 |
| 4,472,131 | 9/1984 | Ryder | 425/548 |
| 4,474,717 | 10/1984 | Hendry | 264/45.5 |
| 4,482,515 | 11/1984 | Bühler et al. | 264/102 |
| 4,555,225 | 11/1985 | Hendry | 425/4 R |
| 4,714,423 | 12/1987 | Hattori et al. | 425/376 R |
| 4,740,150 | 4/1988 | Sayer | 425/542 |
| 4,779,667 | 10/1988 | Fujino et al. | 164/305 |
| 4,781,554 | 11/1988 | Hendry | 425/4 R |
| 4,838,338 | 6/1989 | Priem | 164/113 |
| 4,923,666 | 5/1990 | Yamazaki et al. | 264/572 |
| 4,923,667 | 5/1990 | Sayer | 264/572 |
| 4,938,681 | 7/1990 | Gellert | 425/549 |
| 4,942,006 | 7/1990 | Loren | 264/50 |
| 4,944,910 | 7/1990 | Hendry | 264/572 |
| 5,028,377 | 7/1991 | Hendry | 264/572 |
| 5,032,345 | 7/1991 | Hendry | 264/572 |
| 5,064,168 | 11/1991 | Raines et al. | 251/322 |
| 5,127,814 | 7/1992 | Johnson et al. | 425/130 |
| 5,131,226 | 7/1992 | Hendry | 60/418 |
| 5,137,680 | 8/1992 | Hendry | 264/572 |
| 5,149,546 | 9/1992 | Nelson | 425/130 |
| 5,164,200 | 11/1992 | Johnson | 425/130 |
| 5,256,047 | 10/1993 | Moldovanyi | 425/130 |
| 5,273,417 | 12/1993 | Nelson | 425/130 |
| 5,304,341 | 4/1994 | Shah | 264/572 |
| 5,344,120 | 9/1994 | Tam et al. | 251/214 |
| 5,364,070 | 11/1994 | Crow | 251/322 |
| 5,433,410 | 7/1995 | Foltz | 251/100 |
| 5,449,284 | 9/1995 | Spina | 425/525 |
| 5,466,141 | 11/1995 | Eckardt et al. | 425/130 |
| 5,497,740 | 3/1996 | Thiemeier | 123/188.13 |
| 5,639,405 | 6/1997 | Erikson | 264/40.3 |
| 5,711,344 | 1/1998 | Mullally | 137/596.17 |

*Primary Examiner*—Tim Heitbrink
*Attorney, Agent, or Firm*—Biebel & French

[57] ABSTRACT

A pressure-activated valve for conducting pressurized gas into a mold cavity of an injection molding apparatus is preferably constructed as an easily replaceable unit. The preferred valve includes a pin having a flared head section. The head section has a planar face transverse to an axis of the pin so as to approximately conform to a neighboring contour of the mold cavity. The valve also includes a body in which a passageway intersects a second end of the body to define a port and a flaring seat communicates through a first end of the body between the passageway and the mold cavity. A restrainer which abuts against the second end of the body includes a guideway aligned with the passageway through the body as well as at least one cross-channel which admits pressurized gas to that passageway through the port. The pin extends through both the passageway and the guideway so that its head portion is positioned near the seat. A spring retainer threadedly engages an end portion of the pin which projects out of the guideway in the restrainer. A coiled compression spring encircling the restrainer is compressed between the spring retainer and the second end of the body so that the spring force urges the head section of the pin against the seat to close the valve. The valve allows the pressurized gas to flow into the mold cavity while preventing the molding composition from flowing back and obstructing a supply of pressurized gas to the valve.

18 Claims, 5 Drawing Sheets

PRESSURE-ACTIVATED GAS INJECTION VALVE FOR AN INJECTION MOLDING APPARATUS

FIELD OF THE INVENTION

The present invention pertains to apparatus for injection molding plastic parts by partially filling a mold cavity with a molding composition and then injecting pressurized gas into the molding composition to press the composition outwardly against the sides of the cavity. More particularly, the invention pertains to a reliable, easily replaceable pressure-activated gas injection valve which allows pressurized gas to flow into the mold cavity while preventing the molding composition from flowing back and obstructing the supply of pressurized gas to the valve.

BACKGROUND OF THE INVENTION

Many hollow plastic parts are currently manufactured by injection molding processes in which gas pressure is used to press a molding composition outwardly against the sides of a mold cavity to form the desired shape. A system for carrying out a process of this sort is described in U.S. Pat. No. 5,639,405 to Erikson. These processes may be used to manufacture parts having lower weights and reduced material costs as opposed to parts manufactured by injection molding techniques which do not use gas injection. The use of such processes also reduces mold shrikage, leading to parts having improved tolerances and better surface appearances.

One drawback to such processes is that the operating pressure in the mold cavity is sufficient to drive at least a portion of the molding composition into the pressurized gas supply during those periods when pressurized gas is not being supplied. As the molding composition accumulates and hardens in passages leading from the supply to the mold cavity, these passages may become obstructed. Typically, the accumulated material cannot simply be flushed from these passages. Instead, the injection molding apparatus must be disassembled to remove the obstruction.

Nelson U.S. Pat. No. 5,149,546 proposed a check valve which allowed fluid or gas to be injected into a molten plastic flow path while purportedly preventing or minimizing back flow of molten plastic into the fluid or gas supply system. The check valve comprised a valve body and a separate tapered valve member adapted to fit within a tapered valve chamber at the end of a bore through the valve body. It is believed that the handling of the loose, relatively small tapered valve member increased the difficulty of installing or replacing this check valve. Furthermore, the check valve shown in Nelson includes a significant amount of dead space located radially outwardly from the valve member. This space provides an undesirable site in which molding composition could accumulate and potentially interfere with the operation of the valve.

Therefore, there remains a need in the art for valves for an injection molding apparatus adapted to minimize the backflow of molding composition into the pressurized gas supply.

SUMMARY OF THE INVENTION

This need and others are met by a novel pressure-activated valve for an injection molding apparatus. The valve preferably comprises a pin, a valve body and a compression spring. The pin has a stem section and a flared head section. The valve body, which has a first end and a second end, includes a passageway extending from the first to second end and including defining an inlet port proximate the second end for receiving a fluid such as pressurized gas. The valve body also includes a flared seat at its first end which communicates with the passageway. The stem section of the pin extends through the entire passageway (that is, through both the seat and the inlet port) so that the head section is positioned near the seat. The compression spring serves to close the valve by pulling the stem section of the pin to urge the head section into engagement with the seat.

A preferred application of the pressure-activated valve of the invention is as a gas injection valve in an injection molding apparatus. Such an injection molding apparatus additionally comprises at least two mold members which cooperate to define a mold cavity, a plastic injector and a pressurized gas supply. During operation, a molding composition injected through the plastic injector partially fills the mold cavity. Pressurized gas is then injected from the pressurized gas supply through the gas injection valve into the molding composition.

While the molding composition is being charged into the mold cavity, the compression spring urges the head section against the seat to close the valve. At or near the point in time when a full charge of the molding composition has been injected into the mold cavity, pressurized gas is supplied to the second end of the valve's body. This pressurized gas enters the passageway through the inlet port in the second end of the body and presses against the flared surface of the head section of the pin. When sufficient gas pressure builds up behind the head section to overcome the combined force of the compression spring and the operating pressure in the mold cavity, the head section shifts outwardly away from the seat to open the valve and admit the pressurized gas into the molding composition.

While the pressurized gas is flowing into the molding composition, its pressure suffices to prevent the molding composition from flowing back into the gas injection valve. Once a full charge of pressurized gas has been delivered to the mold cavity, however, this pressure is relieved. Then, the combined force of the compression spring and the operating pressure in the mold cavity urges the head section of the pin against the seat to close the valve. In this way, the gas injection valve prevents the molding composition from flowing back toward the pressurized gas supply during those portions of the injection molding process in which the gas pressure itself does not suffice to prevent backflow of the molding composition.

When the pressure-activate valve of the invention is used as a gas injection valve for an injection molding apparatus, it is desirable to provide a radial clearance of approximately 0.002 inch to 0.006 inch (approximately 0.05 mm to 0.15 mm) between the pin and the inner surface of the passageway through the valve body. This provides sufficient clearance for gas flow while minimizing the size of the valve passageway to thereby inhibit the back flow of molding composition.

An especially preferred valve in accordance with the invention is constructed as an easily removable and replaceable unit. This valve includes a pin having a flared head section carried by a cylindrical or prismatic stem section along a longitudinally extending axis. The head section has a planar face transverse to the axis defined by the stem section on which the operating pressure in the mold cavity acts to help close the valve.

This valve also includes a body having first and second ends. A passageway runs through the body from the first to the second end with an inlet port formed proximate the second end. In addition, a restrainer abuts against the second end of the body. The restrainer includes a guideway aligned with the passageway through the body as well as at least one cross-channel which admits pressurized gas to the passageway through the inlet port.

A flared seat is formed at the first end of the body between the passageway and the mold cavity. The stem section of the pin extends along the passageway through the body and the guideway through the restrainer so that the head portion of the pin is situated near the seat to open and close the valve.

A coiled compression spring is seated between the second end of the body and a spring retainer threadedly engaged with the stem section of the pin. The spring force urges the head section of the pin against the seat to close the valve. The restrainer, which is encircled by the compression spring, limits the movement of the spring retainer toward the second end of the body so as to limit the degree to which the valve may open. The body of the especially preferred valve is provided with threads so that the valve may be quickly installed or removed as a unit from the mold cavity.

The invention will be fiber described in conjunction with the appended drawings and detailed description.

DETAILED DESCRIPTION OF THE PREFERRED EMBODIMENT(S)

Figure 1:
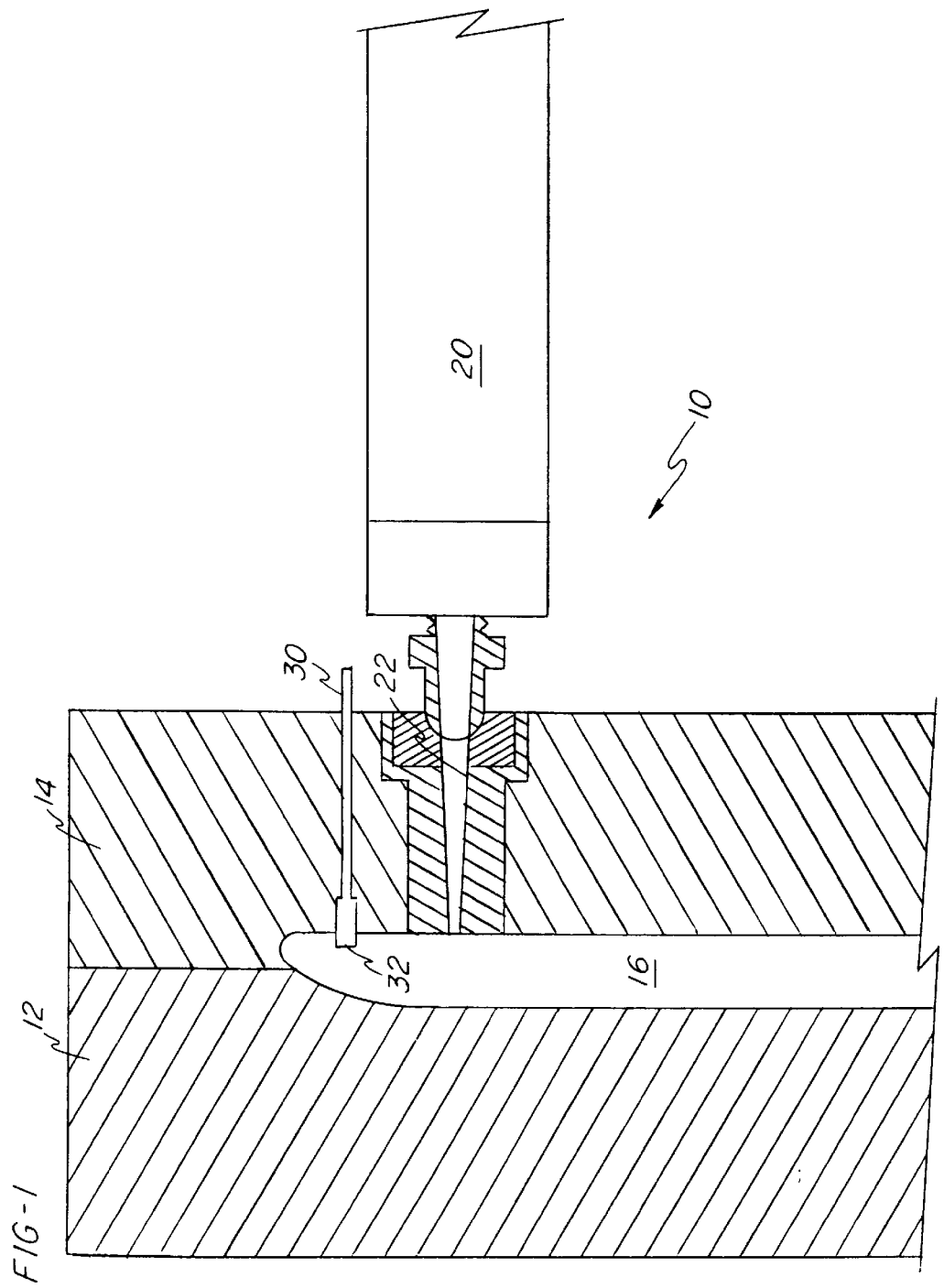
FIG. 1 is a schematic view of an injection molding apparatus.

FIG. 1 shows an injection molding apparatus 10 for manufacturing a part (not shown) from a molding composition (not shown) such as a molten or softened thermoplastic, the selection of which is within the ordinary skill in the art. As shown schematically in FIG. 1, the injection molding apparatus 10 includes a first mold member 12 and a second mold member 14 which cooperate to define a mold cavity 16. A plastic injector 20 communicates with the mold cavity 16 through a sprue 22 for charging the mold cavity 16 with the molding composition (not shown). A pressurized gas supply, represented by a conduit 30, supplies pressurized gas to the mold cavity 16 through a gas injection valve 32 which is spaced from the plastic injector 20. The present invention is not limited to any particular form of pressurized gas supply (not shown, except for the conduit 30), the design of which is within the ordinary skill in the art.

At the beginning of the molding process, the first and second mold members 12, 14 are moved together to close the mold cavity 16. The molding composition (not shown) is driven under pressure through the plastic injector 20 and the sprue 22 to partially fill the mold cavity 16. Starting at or near the point in time when a full charge of the molding composition has been injected into the mold cavity 16, inert pressurized gas (not shown) is injected through the conduit 30 and the gas injection valve 32 into the mold cavity 16. When a full charge of the pressurized gas has been supplied to the mold cavity 16, the pressurized gas is shut off. After the molding composition hardens in the mold cavity 16, the mold members 12, 14 are separated to remove the part (not shown).

Figure 2:
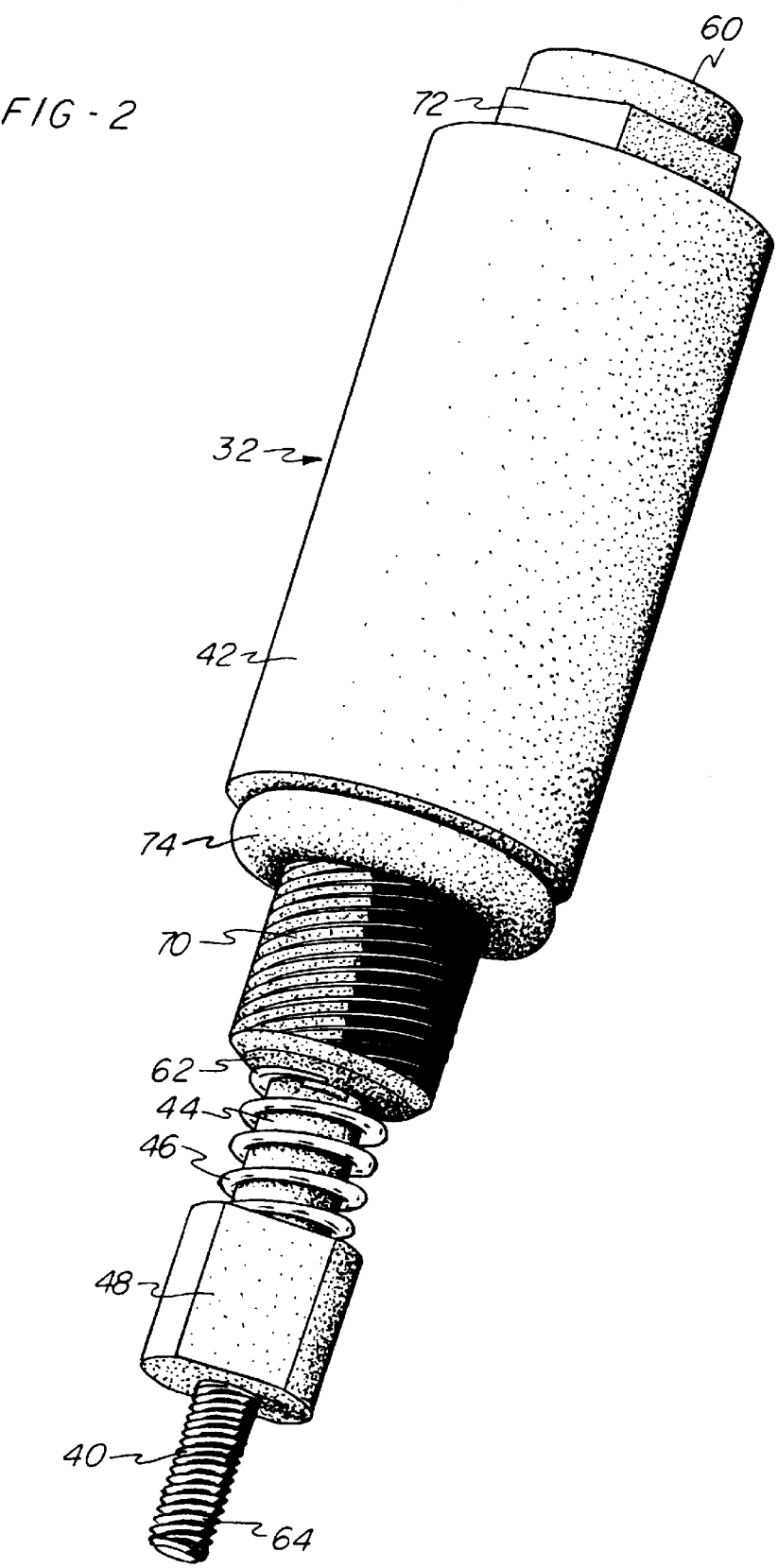
FIG. 2 is a perspective view of a preferred pressure-activated valve according to the invention which may be used in an injection molding apparatus of the type shown in FIG. 1.

A preferred gas injection valve 32 is shown in FIG. 2. The valve 32 includes a pin 40, a valve body 42, a restrainer 44, a coiled compression spring 46 and a spring retainer 48. The valve body 42 defines a first end 60 and a second end 62. The restrainer 44 abuts against the second end 62 of the valve body 42. The pin 40 extends through the valve body 42 and the restrainer 44 so that an externally threaded end portion 64 of the pin 40 projects beyond the restrainer 44. The spring retainer 48 is threadedly engaged with the externally threaded end portion 64 of the pin 40 and thereby carries the pin. The compression spring 46 is trapped between the first end 60 of the valve body 42 and the spring retainer 48 so as to urge the externally threaded end portion 64 of the pin 40 away from the first end 60 of the body 42. The spring retainer 48 is spaced from the restrainer 44 to permit the spring retainer 48 and the pin 40 to move only a limited distance against the force of the compression spring 46.

Figure 3:
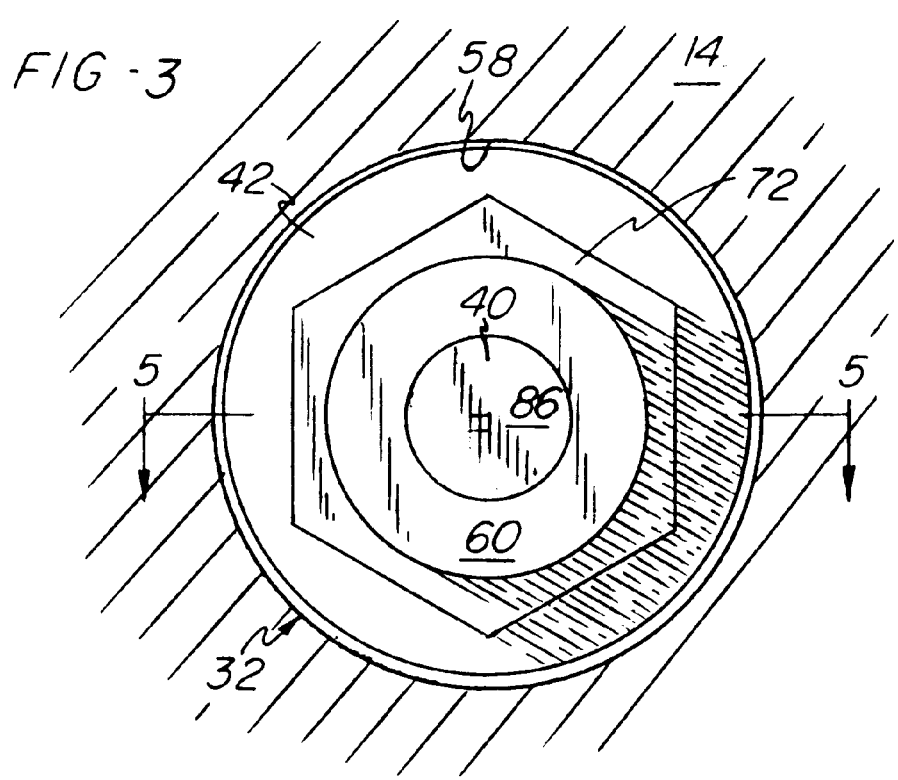
FIG. 3 is a plan view of a first end of the preferred pressure-activated valve of FIG. 2 installed in an internally threaded recess in a mold member of the injection molding maching of FIG. 1.

The valve 32 is constructed as a unit for ease of installation and replacement. External threads 70 are provided near the second end of the valve body 42 for installing the valve 32 in an internally threaded recess 58 (FIG. 3) in one of the first and second mold members 12, 14 (FIG. 1). More specifically, the valve body 42 may be threadedly affixed to one of the mold members 12, 14 (FIG. 1) so that the first end 60 of the valve body 42 projects into the mold cavity 16. The pressurized gas supply (e.g., the conduit 30 of FIG. 1) communicates with the second end 62 of the valve body 42 to supply pressurized gas to the valve 32 through the radial clearance between pin 40 and an internal bore extending through the valve body as shall be explained in detail hereinafter. An O-ring or gasket 74 engages the valve body 42 near the external threads 70 to block the molding composition (not shown) from flowing around the body 42 toward the conduit 30 (FIG. 1). As best shown in FIGS. 2 and 3, a hex head 72 is provided near the second end 62 of the valve body 42 to assist in turning the valve body 42 to install or remove the valve 32.

Figure 4:
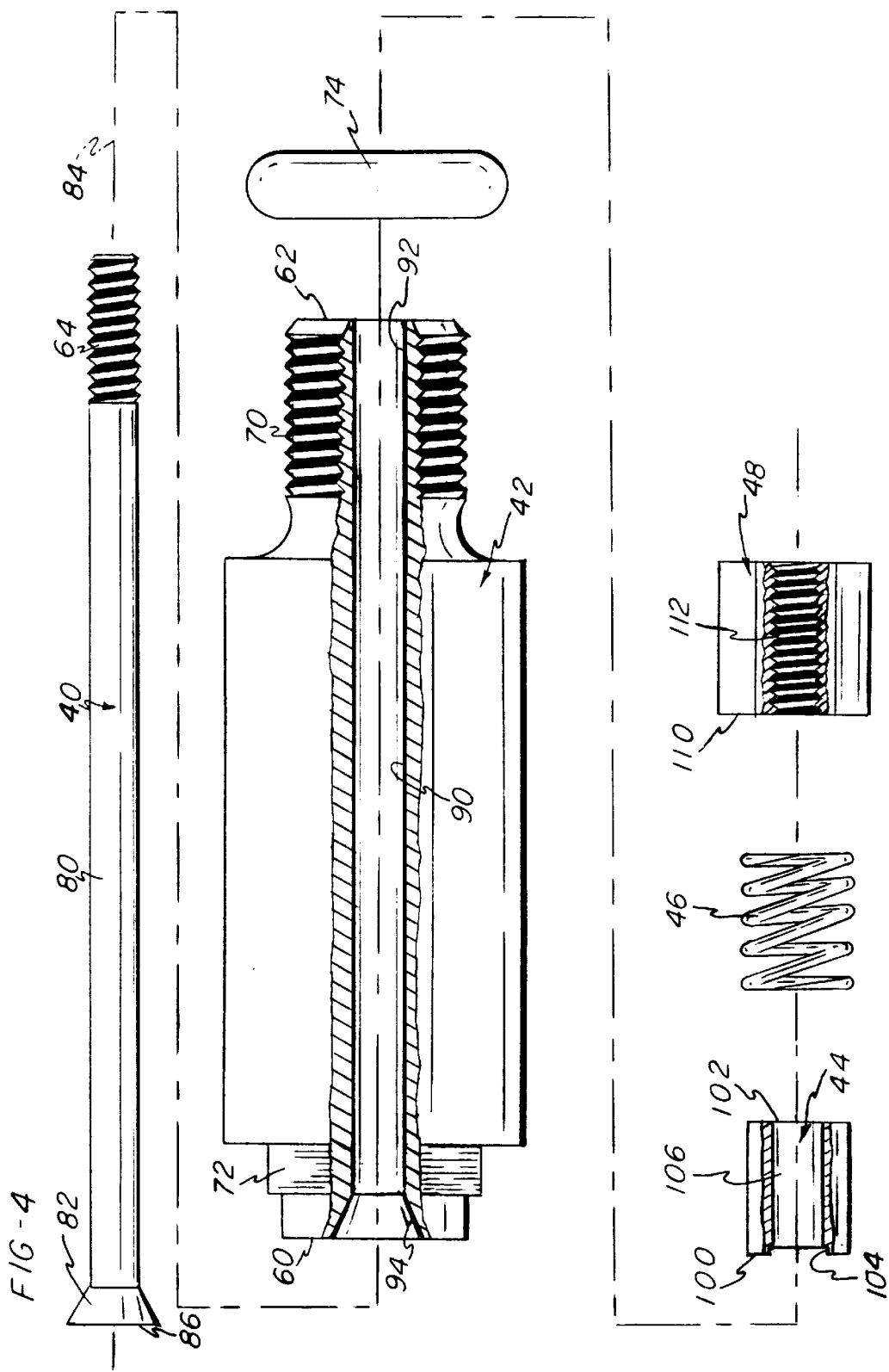
FIG. 4 is an exploded view of the pressure-activated valve of FIG. 2, in which several parts are broken away to show internal passageways, guideways and threads.

As shown in FIG. 4, the pin 40 includes a cylindrical stem section 80 and a flared head section 82 in the form of a truncated cone. The externally threaded end portion 64 terminates the stem section 80 opposite the head section 82. The stem section 80 (which, alternatively, may be in the form of an elongated prism with a polygonal or other cross-section) defines an axis which coincides with the section of the phantom line 84 immediately surrounding the pin 40 in FIG. 4. The head section 82 has a planar face 86 which is transverse (in this example, normal) to the axis of the stem section 80 (that is, to the phantom line 84 in FIG. 4). The largest diameter section of the truncated cone is located along the face 86. The planar face 86, combined with the generally planar surface of the valve body 42 at its first end 60, minimizes the distortion of the surface of the molded part (not shown) in the region formed adjacently to the valve 32.

A cylindrical passageway 90 runs through the length of the body 42. The passageway 90 intersects the second end 62 of the body 42 to define a port 92 through which the pressurized gas may enter the passageway 90. A flared seat 94 congruent with the truncated conical shape of the head section 82 is formed in the first end 60 of the valve body 42. When the valve 32 is installed in the mold cavity 16 (FIG. 1) of an injection molding apparatus 10 (FIG. 1), the seat 94 provides communication between the passageway 90 and the mold cavity 16. While the passageway 90 is shown as being circular in cross-section, it may assume any cross-section necessary to accommodate the shape of the stem and head sections 80, 82 of the pin 40 without departing from the scope of the invention.

The restrainer 44 includes two generally planar surfaces 100 and 102; a cross-channel or groove 104 formed in the otherwise planar surface 100; and a guideway 106 running from the cross-channel 104 to the surface 102. The spring 96, upon assembly, concentrically surrounds the restrainer.

When the valve 32 (FIGS. 1–3) is assembled, the surface 100 abuts against the second end 62 of the body 42 so that the cross-channel 104 communicates with the port 92 in the body 42 to admit pressurized gas to the passageway 90. The guideway 106 is aligned with the passageway 90, but has an inner diameter which is only large enough to slidingly accommodate the stem section 80 of the pin 40.

The spring retainer 48 includes a planar surface 110 and internally threaded bore 112 intersecting the planar surface 110 for threaded engagement with the externally threaded end portion 64 of the pin 40. The spring retainer 48 has a maximum outer diameter larger than an outer diameter of the compression spring 46 to permit the spring retainer 48 to trap the compression spring 46 between itself and the second end 62 of the body 42. Despite this, the spring retainer 48 preferably has a non-circular cross-section normal to a length of the internally threaded bore 112 to facilitate the engagement of the spring retainer 48 with the stem section 80 of the pin 40.

The pin 40, the valve body 42, the restrainer 44, the compression spring 46 and the spring retainer 48 are all preferably constructed of metal. Alternatively, one or more of these parts may be constructed of a polymeric or ceramic material capable of maintaining its shape under the heat and pressure conditions present in and around the mold cavity 16 (FIG. 1).

In order to construct the valve 32 (FIGS. 1–3), the pin 40 is inserted into the abutting valve body 42 and restrainer 44 so that the stem section 80 extends through the entire passageway 90 (that is, through both the port 92 and the seat 94) in the valve body 42 and the entire guideway 106 in the restrainer 44. Thus installed, the head section 82 is positioned near the seat 94 and the externally threaded end portion 64 projects outside the valve body 42 and the restrainer 44. The compression spring 46 is fit around the restrainer 44 so that it abuts against the second end 62 of the body 42. Next, the spring retainer 48 is threadedly engaged with the externally threaded end portion of the stem section 80. The compression spring 46 then biases the spring retainer 48 away from the second end 62 of the body 42 so that the stem section 80 of the pin 40 is pulled outwardly through the port 92 to close the valve 32.

Figure 5:
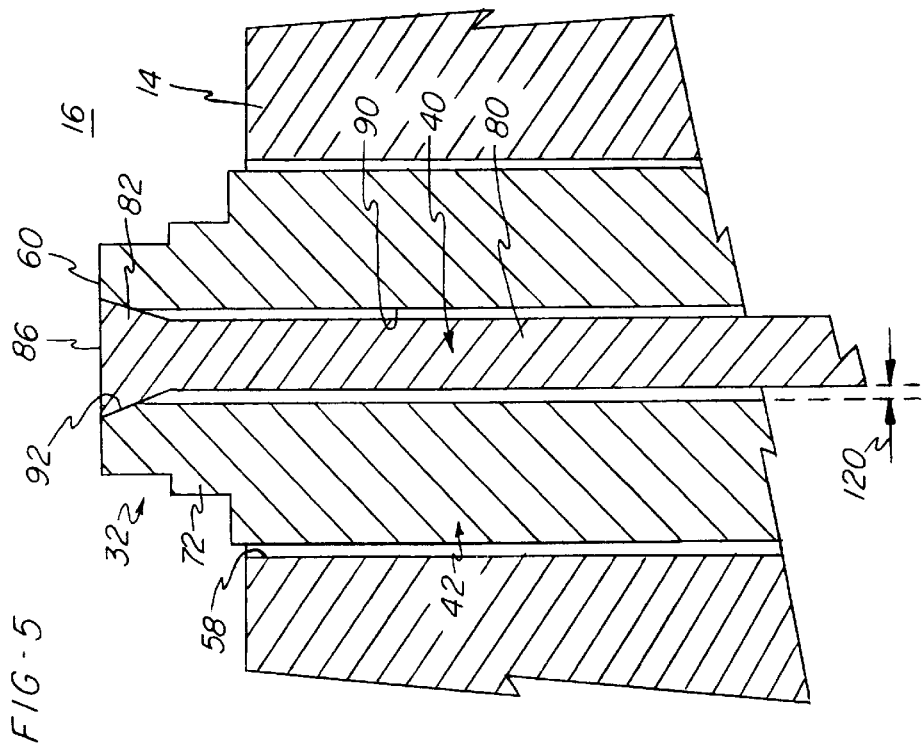
FIG. 5 is a partial sectional view of the preferred pressure-activated valve in a closed state, taken along the line 5—5 in FIG. 3.

During the injection molding process, the molding composition (not shown) is first injected under pressure into the mold cavity 16 (FIGS. 1 and 5) through the plastic injector 20 (FIG. 1) and the sprue 22 (FIG. 1). At this point in the process, pressurized gas is not supplied to the valve 32 FIGS. 1–3 and 5). The combined force of the compression spring 46 on the spring retainer 48 and the operating pressure in the mold cavity 16 on the planar face 86 of the head section 82 of the pin 40 urges the head section 82 against the seat 94 in the first end 60 of the body 42 to close the valve 32 (FIG. 5). The position of the head section 82 relative to the seat 94 when the valve 32 is closed is shown in FIG. 5.

At or near the point in time when a full charge of the molding composition (not shown) has been injected into the mold cavity 16, the pressurized gas (not shown) is supplied to the valve 32 through the conduit 30 (FIG. 1). This pressurized gas enters the passageway 90 through the cross-channel 104 in the restrainer 44 and the port 92 in the second end 62 of the body 42. When sufficient gas pressure builds up behind the head section 82 of the pin 40 (and/or behind the retainer 48) to overcome the combined force of the compression spring 46 on the spring retainer 48 and the operating pressure in the mold cavity, the head section 82 shifts outwardly away from the seat 94 to open the valve and admit the pressurized gas into the molding composition. The position of the head section 82 relative to the seat 94 when the valve 32 is open is shown in FIG. 6.

Figure 6:
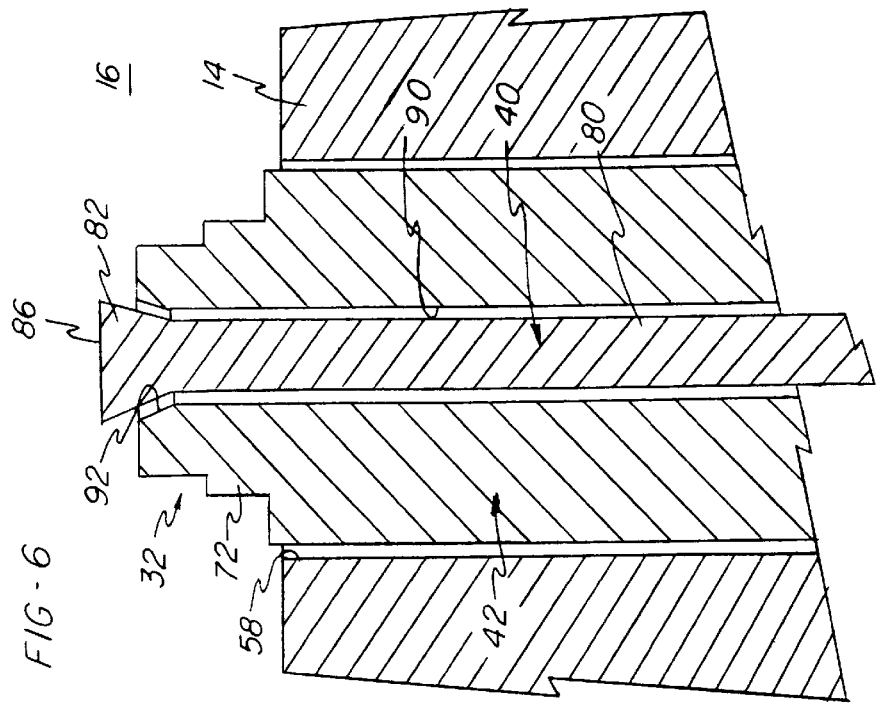
FIG. 6 is a partial sectional view of the preferred pressure-activated valve in an open state, taken along the line 5—5 in FIG. 3.

The pin 40 may flutter or "trumpet" between the positions shown in FIGS. 5 and 6 while the pressurized gas (not shown) is being delivered to the valve cavity 16. This fluttering is within the contemplation of the invention and does not prevent the valve 32 from either delivering a full charge of pressurized gas or preventing the backflow of the molding composition (not shown).

Once a full charge of the pressurized gas (not shown) has been delivered to the mold cavity 16, the gas pressure on the head section 82 of the pin 40 is relieved. Then, the combined force of the compression spring 46 and the operating pressure in the mold cavity 16 on the planar face 86 of the head section 82 urges the head section 82 against the seat 94 to close the valve.

As shown in FIG. 5, the head section 82 closes against the seat 94 so that the planar face 86 is flush with the surface of the first end 60 of the body 42. During the injection of the pressurized gas (not shown), the molding composition (not shown) forms a hollow shell (not shown) against the inner surface of the mold cavity 16. A hole (not shown) forms in this hollow shell adjacent the valve 32 where the pressurized gas is injected into the molding composition. Since the molding composition is still fluid during and immediately after the injection of the pressurized gas (not shown), the pressure of the gas in the mold cavity 16 drives the molding composition against the first end 60 of the body 42 to at least partially close the hole in the hollow shell once the gas pressure is relieved.

It is desirable to provide a radial clearance 120 of approximately 0.002 inch to 0.006 inch (approximately 0.05 mm to 0.15 mm) between the stem section 80 of the pin 40 and the inner surface of the passageway 90 through the body 42. This provides sufficient clearance for gas flow while both minimizing the size of the valve 32 and preventing any molding composition which might get into the passageway from flowing back toward the pressurized gas supply.

Therefore, the preferred valve 32 of the present invention allows pressurized gas to flow into the mold cavity while inhibiting back flow of the molding composition. Preliminary runs have been made where valves in accordance with the invention have performed successfully, without clogging, for a period of about four months. As best shown in FIGS. 5 and 6, there is little or no dead space adjacent the valve 32 in which the molding composition can collect and interfere with the operation of the valve 32. The preferred valve 32 is highly reliable, having been operated for periods on the order of four months without failure.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

What is claimed is:

1. A pressure-activated valve for an injection molding apparatus a comprising:
    a pin having a cylindrical or prismatic stem section and a flared head section;
    a valve body having a first end and a second end, said valve body including a passageway communicating with said first and second ends;
    a port proximate said second end and communicating with said passageway for receiving pressurized fluid;
    said valve body including a flared seat proximate said first end and communicating with said passageway, said stem section of said pin being positioned in said passageway with said head section positioned near said seat so as to provide a radial clearance of approximately 0.002 inch to 0.006 inch (approximately 0.05 mm to 0.15 mm) between said stem section and said passageway through said valve body; and
    a compression spring operatively associated with said stem section to bias said head section into seated engagement with said seat.

2. The pressure-activated valve as recited in claim 1 wherein said stem section defines an axis and said head section defines a planar face transverse to said axis.

3. The pressure-activated valve as recited in claim 1 wherein said valve body includes threads for positioning said valve body relative to a mold cavity of the injection molding apparatus.

4. The pressure-activated valve as recited in claim 1 including a spring retainer engaging said stem section outside said second end of said valve body for engagement with said compression spring.

5. A pressure-activated valve for an injection molding apparatus comprising:
    a pin having a stem section and a flared head section;
    a valve body having a first end and a second end, said valve body including a passageway communicating with said first and second ends;
    a port proximate said second end and communicating with said passageway for receiving pressurized fluid;
    said valve body including a flared seat proximate said first end and communicating with said passageway, said stem section of said pin being positioned in said passageway with said head section positioned near said seat;
    a compression spring operatively associated with said stem section to bias said head section into seated engagement with said seat;
    a restrainer abutting said second end of said valve body, said restrainer including a guideway aligned with said passageway for receiving said stem section and at least one cross-channel communicating with said port; and
    a spring retainer spaced from said restrainer and threadedly engaging said stem section;
    said compression spring being a coiled spring encircling said restrainer, said coiled spring being trapped between said spring retainer and said second end of said body.

6. The pressure-activated valve as recited in claim 5 wherein said stem section is cylindrical or prismatic.

7. The pressure-activated valve as recited in claim 5 wherein said, stem section defines an axis and said head section defines a planar face transverse to said axis.

8. The pressure-activated valve as recited in claim 5 including a radial clearance of approximately 0.002 inch to 0.006 inch (approximately 0.05 mm to 0.15 mm) between said stem section and said passageway.

9. A pressure-activated valve for an injection molding apparatus comprising:
    a pin having a stem section and a flared head section, said pin extending along a longitudinal axis of said apparatus;
    said head section having a planar face transverse to said axis;
    a body having a first end and a second end;
    said body including a passageway defining a port through said second end of said body for receiving pressurized gas;
    said body having a flaring seat through said first end communicating with said passageway;
    said stem section of said pin extending through said seat and said port so that said head portion is near said seat;
    a restrainer abutting said second end of said body, said restrainer including a guideway aligned with said passageway for receiving said stem section and at least one cross-channel communicating with said port;
    a coiled compression spring encircling said restrainer; and
    a spring retainer threadedly engaging the stem section outside said body;
    said coiled compression spring being trapped between said spring retainer and said second end of said body.

10. The pressure-activated valve as recited in claim 9 wherein said body includes threads for positioning the body relative to a mold cavity of the injection molding apparatus.

11. An injection molding apparatus comprising:
    at least two mold members cooperating to define a mold cavity;
    a plastic injector in fluid communication with said mold cavity; and
    a gas injection valve spaced from said plastic injector, said gas injection valve including:
        a pin having a stem section and a flared head section;
        a valve body having a first end and a second end, said valve body including a passageway communicating with said first and second ends;
        a port proximate said second end and communicating with said passageway for receiving pressurized fluid;
        said valve body including a flared seat proximate said first end and communicating with said passageway, said stem section of said pin positioned in said passageway with said head portion positioned near said seat;
        a compression spring operatively associated with said stem section to bias said valve head into seated engagement with said valve seat; and
        a pressurized gas feed communicating with said mold cavity, through said passageway.

12. The injection molding apparatus as recited in claim 11 wherein said gas injection valve is threadedly affixed to one of said at least two mold members.

13. The injection molding apparatus as recited in claim 11 wherein said gas injection valve includes a radial clearance of approximately 0.002 inch to 0.006 inch (approximately 0.05 mm to 0.15 mm) between said stem section and said passageway.

14. The injection molding apparatus as recited in claim 11 wherein said gas injection valve includes a spring retainer fixedly secured to said stem section proximate said second end.

15. The injection molding apparatus as recited in claim 11 wherein said gas injection valve includes:
 a restrainer abutting said second end of said valve body, said restrainer including a guideway aligned with said passageway for receiving said stem section therein, and at least one cross-channel communicating with said port; and
 a spring retainer spaced from said restrainer and threadedly engaging said stem section;
 said compression spring being a coiled spring encircling said restrainer, said coiled spring disposed between said spring retainer and said second end of said body.

16. A removable and replaceable pressure-activated valve unit for an injection molding apparatus comprising:
 a pin having a stem section and a flared head section;
 a valve body having a first end and a second end, said valve body including a passageway communicating with said first and second ends, said valve body including external threads near said second end for coupling said valve body to a mold member of the injection, molding apparatus;
 a port proximate said second end and communicating with said passageway for receiving pressurized fluid;
 said valve body including a flared seat proximate said first end and communicating with said passageway, said stem section of said pin being positioned in said passageway with said head section positioned near said seat;
 a spring retainer engaging said stem section outside said second end of said valve body; and
 a compression spring trapped between said spring retainer and said second end of said body.

17. The removable and replaceable pressure-activated valve unit as recited in claim 16 wherein said stem section is cylindrical or prismatic.

18. The removable and replaceable pressure-activated valve unit as recited in claim 16 wherein said stem section defines an axis and said head section defines a planar face transverse to said axis.

\* \* \* \* \*